United States Patent
Pickeral

[19]

[11] Patent Number: 5,887,057
[45] Date of Patent: Mar. 23, 1999

[54] SYSTEM AND METHOD FOR OVERFLOW ON DEMAND IN A TELECOMMUNICATIONS NETWORK

[75] Inventor: Eddie L. Pickeral, Plano, Tex.

[73] Assignee: MCI Communications Corporation, Del.

[21] Appl. No.: 15,127

[22] Filed: Jan. 29, 1998

[51] Int. Cl.⁶ ........................................................ H04M 3/00
[52] U.S. Cl. .................... 379/265; 379/221; 379/127; 455/412; 455/413; 455/414
[58] Field of Search ..................... 455/412, 413, 455/414, 417, 445; 379/127, 134, 116, 229, 207, 221, 243, 265, 266; 370/237, 259, 271

[56] References Cited

U.S. PATENT DOCUMENTS

| | | | |
|---|---|---|---|
| 5,185,786 | 2/1993 | Zwick | 379/201 |
| 5,384,841 | 1/1995 | Adams et al. | 379/266 |
| 5,627,875 | 5/1997 | Kapsales | 455/414 |
| 5,724,419 | 3/1998 | Harbuziuk et al. | 379/265 |
| 5,758,279 | 5/1998 | Foti | 455/412 |

*Primary Examiner*—Wellington Chin
*Assistant Examiner*—Isaak R. Jama

[57] ABSTRACT

A system and method for providing overflow on demand in a telecommunications network. The network includes at least one originating call location, at least one terminating call location that subscribes to an overflow on demand service, a data access point (DAP), and at least one switch. When a caller at the originating call location places a call to a chosen call terminating location, the call is routed to that location via the switch under DAP control. Under certain circumstances, the caller can cause overflow processing to occur by merely pressing the "*" key, on a telephone keypad. Overflow processing typically includes routing the call to an overflow call terminating location specified in the call processing plan for the chosen location.

14 Claims, 7 Drawing Sheets

SYSTEM AND METHOD FOR OVERFLOW ON DEMAND IN A TELECOMMUNICATIONS NETWORK

BACKGROUND OF THE INVENTION

1. Field of the Invention

The present invention relates generally to telephony, and more particularly to allowing a caller to initiate call overflow in a telecommunications network.

2. Related Art

The proliferation of virtual private networks, such as MCI VNET, has introduced many new functions for telecommunications networks. One such function is known as "call overflow." In a conventional implementation, call overflow causes a call to a particular terminating location to be redirected to a predetermined overflow location under certain conditions, referred to herein as "overflow conditions." Overflow conditions can include abnormal call termination, expiration of a timer, certain busy conditions, and the like.

Figure 1:
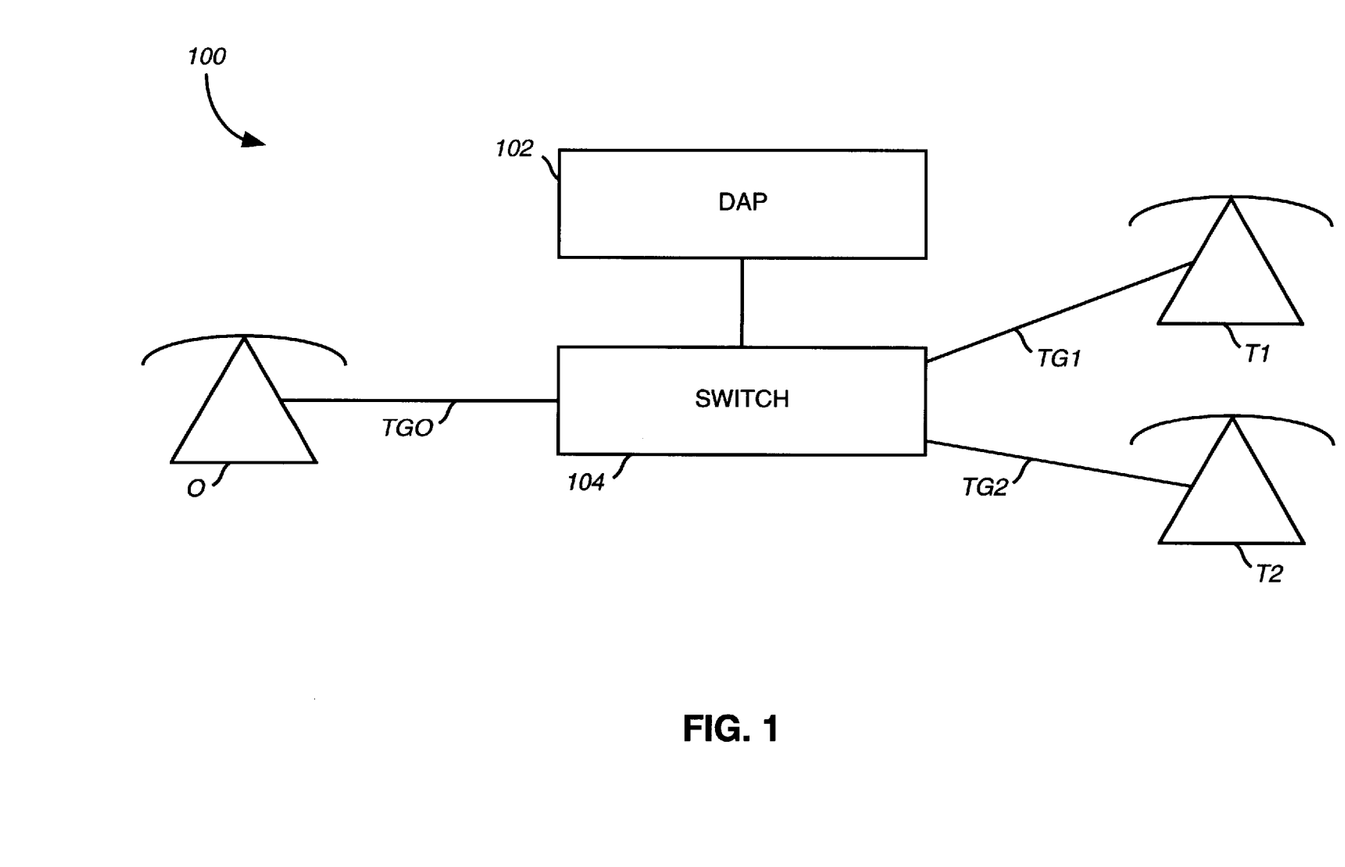
FIG. 1 depicts a portion of a typical telecommunications network 100.
Figure 2:
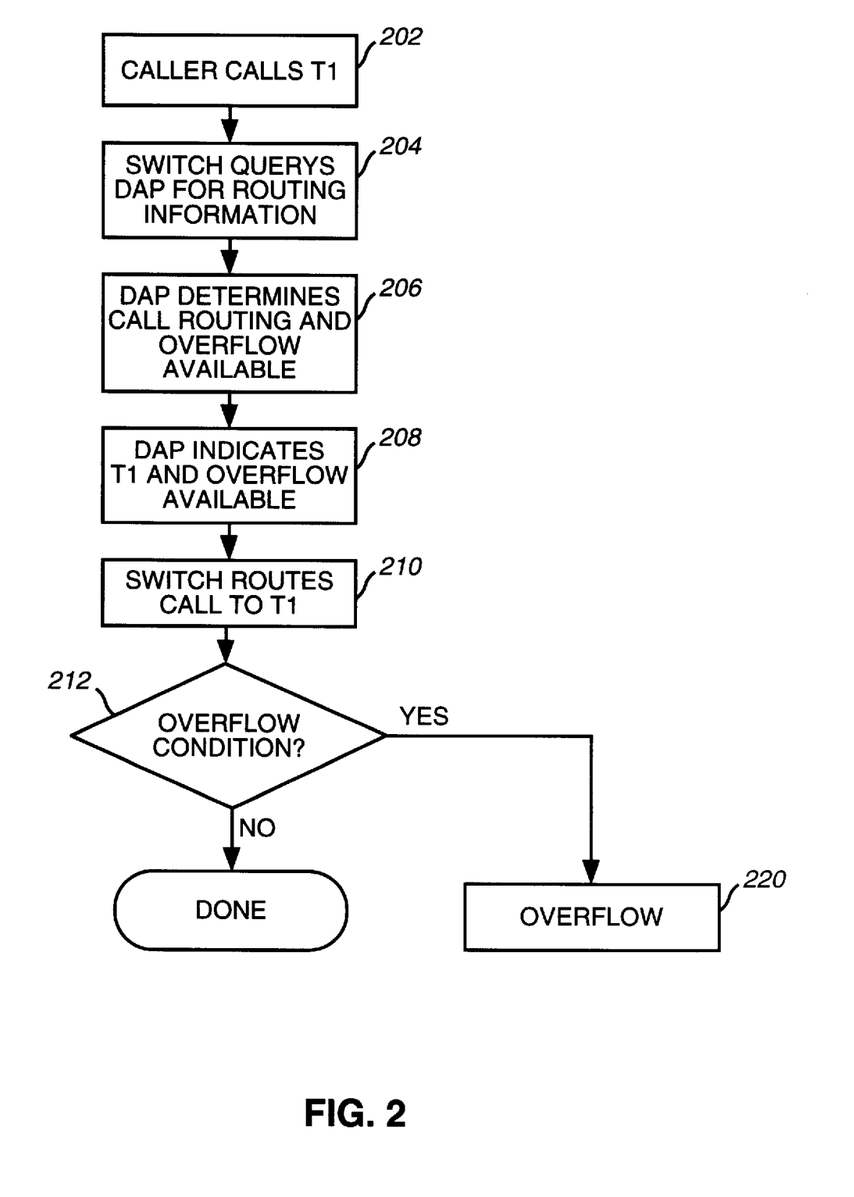
FIG. 2 is a flowchart depicting the operation of a conventional call overflow system.

FIG. 1 depicts a portion of a typical telecommunications network 100. Telecommunications network 100 includes a data access point (DAP) 102, a switch 104, originating call location O, terminating call locations T1 and T2, and trunk groups TG0, TG1, and TG2. FIG. 2 is a flowchart depicting the operation of a conventional call overflow system. In the following example, terminating location T1 subscribes to a conventional call overflow function provided by telecommunications network 100.

Referring to FIG. 2, a caller at call origination location O initiates a call to terminating location T1, as shown in step 202. When switch 104 receives the call, it queries DAP 102 for routing information for the call, as shown in a step 204. DAP 102 consults the call processing plan for terminating location T1. Because terminating location T1 subscribes to the call overflow function, the call processing plan indicates that call overflow is available. Therefore, as shown in step 206, DAP 102 determines that call overflow is available for terminating location T1. In addition, DAP 102 determines the call routing for the call to reach terminating location T1.

DAP 102 sends the call routing information, and a call overflow available indication, to switch 104, as shown in step 208. Switch 104 then routes the call to terminating location T1, as shown in step 210. If an overflow condition occurs, as shown in step 212, then call overflow is performed, as shown in step 220. Typically call overflow processing includes transferring the call to another terminating location. Assume in this example that the call processing plan for terminating location T1 specifies terminating location T2 as the overflow call terminating location. In this example, call overflow processing includes transferring the call from terminating location T1 to terminating location T2.

A primary disadvantage of such conventional implementations is that the caller has no control over the call overflow process. In such an implementation, the caller can only wait for an overflow condition to occur, thereby triggering call overflow processing. In many instances, this wait is considerable. Such long wait times result in increased telephone service costs, inconvenience to the caller, the perception by callers of poor service, and the loss of calls and the business associated with those calls.

SUMMARY OF THE INVENTION

The present invention is a system and method for providing overflow on demand in a telecommunications network. The network includes at least one originating call location, at least one terminating call location that subscribes to an overflow on demand service, a data access point (DAP), and at least one switch. When a caller at the originating call location places a call to a call terminating location, the call is routed to a switch. The switch queries the DAP for call routing information.

In response, the DAP determines an address for the call terminating location, determines that call overflow is available for the call terminating location, and sends to the switch the address and a call overflow availability indicator. In response, the switch routes the call to the terminating location using the address.

Call overflow is then performed under at least two conditions. One condition is the occurrence of an "overflow condition." Example overflow conditions include the receipt at the switch of an All Trunks Busy (ATB) signal, the receipt at the switch of a Release Without Cause (RWC) value other than RWC 16, and the expiration of a subscriber-specified timer at the DAP prior to the receipt at the switch of an Answer signal indicating that the call was answered.

Another condition is the receipt of an overflow command from the call originating location. In a preferred embodiment, the overflow command is a DTMF signal indicating that the caller has pressed a particular key, such as the "*" key, on a telephone keypad. When such an overflow command is received, then call overflow processing is performed. This processing of this condition is referred to as "overflow on demand" processing.

One advantage of the present invention is that the caller need not wait for call overflow to be initiated by the telecommunications network.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

The present invention is a system and method for call overflow on demand. According to a preferred embodiment of the present invention, callers are provided with the capability to initiate call overflow processing by merely pressing the "*" key on the touch-tone keypad of a conventional telephone set. One advantage of the present invention is that the caller need not wait for call overflow to be initiated by the telecommunications network.

In one embodiment, overflow on demand is a service offered to, and subscribed by, particular callers for their own use. For example, overflow on demand may be offered to customers of a virtual private network, such as the MCI VNET. In one embodiment, a customer can specify particular attributes of the service, such as the overflow call location.

In one example of this embodiment, a subscriber subscribes to an overflow on demand service for one of his telephones, such as his office telephone, which is supported by a virtual private network. The subscriber specifies that call overflow processing transfer calls from his office telephone to his voice mail system. With this service, the caller can reach his voice mail system by calling his office telephone.

In a conventional system, the subscriber would have to wait for an overflow condition to occur (e.g., a specified number of rings) before gaining access to his voice mail system. By using the present invention, however, the subscriber can gain access to his voice mail system immediately, by merely pressing the "*" button on the keypad of any touch-tone telephone, as will be described in detail below.

In another embodiment, overflow on demand is offered to subscribers to benefit other callers to the subscriber's telephone. In one example of this embodiment, a caller to a subscriber's telephone may first reach an interactive voice response (IVR) service node, which informs the caller of the availability of the service and provides instructions for its use. The IVR node then routes the call to the subscriber's telephone. The caller can then elect to overflow the call to another telephone by merely pressing the "*" button on the keypad of any touch-tone telephone.

The present invention is described in terms of the above example embodiments. This is for convenience only and is not intended to limit the application of the present invention. In fact, after reading the following description, it will be apparent to one skilled in the relevant art how to implement the following invention in alternative embodiments.

Figure 3:
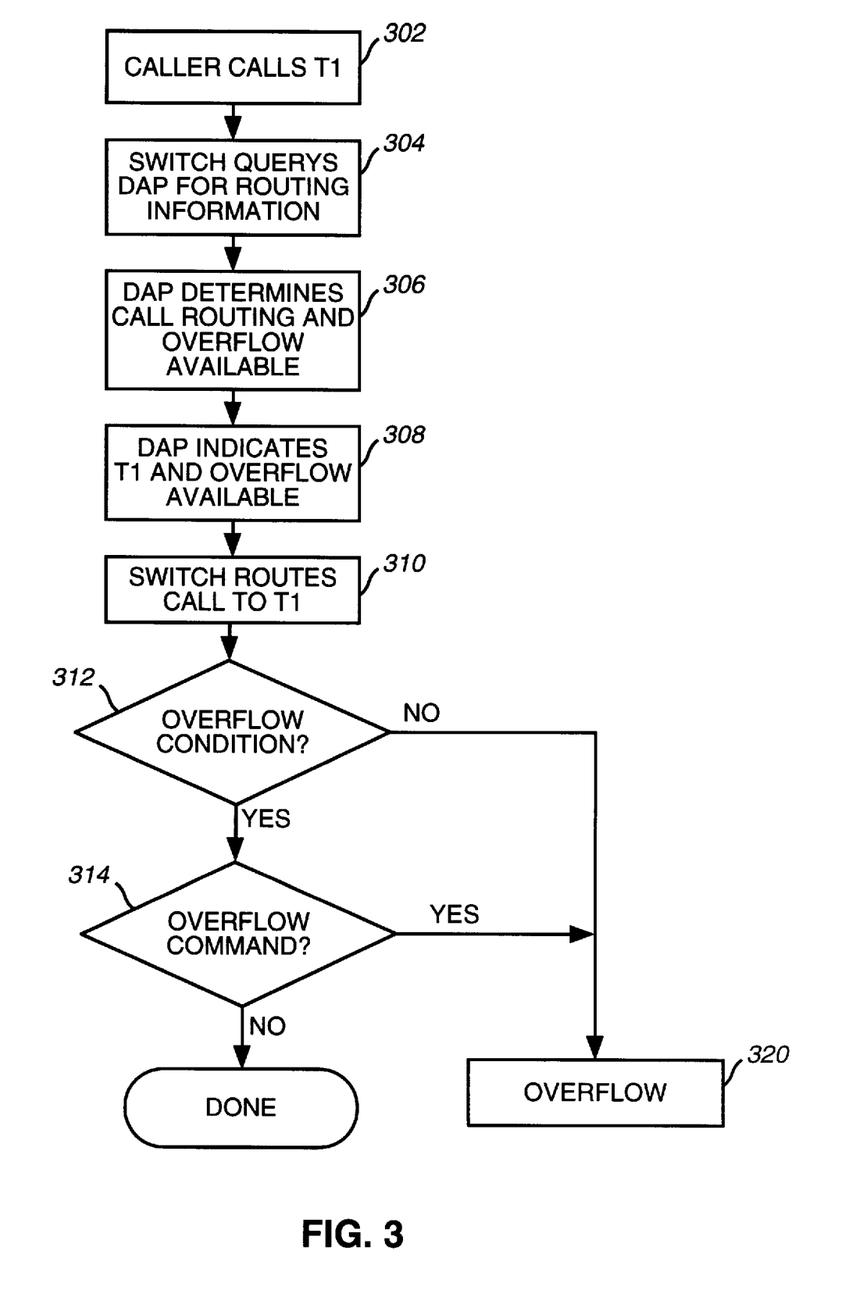
FIG. 3 is a flowchart depicting the operation of the present invention according to a preferred embodiment.

FIG. 3 is a flowchart depicting the operation of the present invention according to a preferred embodiment. In the following example, terminating location T1 subscribes to an overflow on demand service provided on telecommunications network 100 of FIG. 1.

Referring to FIGS. 1 and 3, a caller at call origination location O initiates a call to terminating location T1, as shown in step 302. When switch 104 receives the call, it queries DAP 102 for routing information for the call. DAP 102 consults the call processing plan for terminating location T1. Because terminating location T1 subscribes to the overflow on demand service, the call processing plan indicates that overflow on demand is available. Therefore, as shown in step 306, DAP 102 determines that overflow on demand is available for terminating location T1. In addition, DAP 102 determines the call routing for the call to reach terminating location T1.

DAP 102 sends the call routing information, and an overflow on demand available indication, to switch 104, as shown in step 308. In a preferred embodiment, the call routing information includes the address of terminating location T1. Switch 104 then routes the call to terminating location T1 using the address, as shown in step 310. If an overflow condition occurs, as shown in step 312, then call overflow processing is performed, as shown in step 320 and described in detail below.

One example overflow condition occurs when switch 104 encounters an abnormal condition during the processing of the call. One such abnormal condition is the receipt at switch 104 of an All Trunks Busy (ATB) signal.

Another example overflow condition occurs when the switch receives a Release Without Cause (RWC) value other than RWC 16. Receipt of an RWC signal indicates that the call didn't complete, as is well-known in the relevant art. RWC 16 indicates normal call completion.

Another example overflow condition occurs when a timer at DAP 102 expires prior to the receipt at switch 104 of an Answer signal indicating that the call was answered. According to one embodiment of the present invention, a subscriber of the overflow on demand service can specify an interval after which call overflow processing should be invoked automatically. The interval is incorporated into the call processing plan for the subscriber's telephone number. When a DAP sends an overflow on demand indication to a switch for routing a call to the subscriber's telephone, the DAP sets a timer with the interval value. If no Answer signal is received by the switch when the timer expires, the DAP initiates overflow processing automatically. This example operation is described in more detail below.

Another example overflow condition occurs when a timer in the terminating trunk group (i.e., the trunk group of the terminating call location) expires. In this example embodiment, a timer in the terminating trunk group is started when a call terminates to terminating call location T1. If no Answer signal is received when the timer expires, then the trunk group initiates overflow call processing. This feature, also referred to as "Long Call Disconnect," can be used to combat billing fraud.

According to the present invention, call overflow processing will also be performed when an overflow command is received at the switch. In a preferred embodiment, the overflow command is a DTMF signal indicating that the caller has pressed a particular key, such as the "*" key, on a telephone keypad. When such an overflow command is received, as shown in step 314, then call overflow processing is performed, as shown in step 320.

In a preferred embodiment, in order to prevent the initiation of overflow call processing at inappropriate times, the "*" key initiates overflow call processing only at certain stages within the life of the call. These stages are defined according to the type of signaling used on the terminating trunk. On an SS7 ISUP trunk, overflow on demand call processing is initiated only after an address complete message (ACM) is received at switch 104 and before an Answer message is received at switch 104. On an ISDN trunk, overflow on demand call processing is initiated only after an ALERTING message is received at switch 104 and before an Answer message is received at switch 104. On an INBAND trunk, overflow on demand call processing is initiated only after OUTPULSING has been completed and before Answer has occurred.

Example Operation

For purposes of illustration, an example operation of an embodiment of the present invention is described with reference to FIGS. 1 and 4–6. In this example, both T1 and T2 subscribe to the overflow on demand service of the present invention. Also in this example, the call processing plan for terminating location T1 includes a customer-specified timer interval of 15 seconds, overflow availability, and an call overflow location of T2. Further, the call processing plan for T2 includes no customer-specified timer, overflow availability, and an call overflow location of T2. In addition, the trunk group parameters for terminating trunk group TG2 specify a Long Call Disconnect timer interval of 30 seconds.

Figure 4:
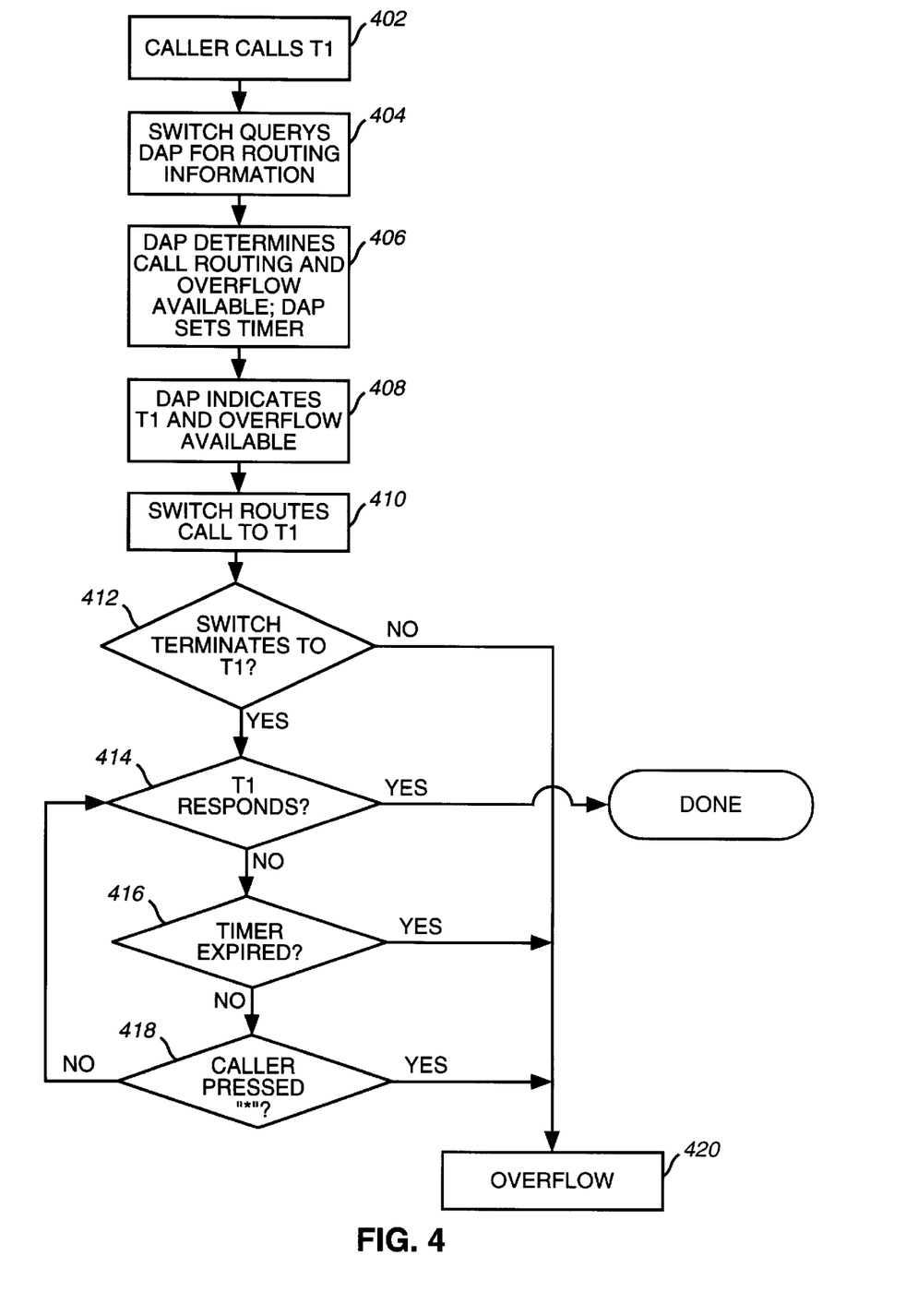
FIG. 4 is a flowchart depicting the operation of the present invention in implementing an example call processing plan.

FIG. 4 is a flowchart depicting the operation of the present invention in implementing the example call processing plan for T1. Referring to FIG. 3, a caller at call origination location O initiates a call to terminating location T1, as shown in step 402. When switch 104 receives the call, it queries DAP 102 for routing information for the call. DAP 102 consults the call processing plan for terminating location T1. Because terminating location T1 subscribes to the overflow on demand service, the call processing plan indicates that overflow on demand is available. Therefore, as shown in step 406, DAP 102 determines that overflow on demand is available for terminating location T1. As mentioned above, the call processing plan for T1 includes a subscriber-specified timer interval of 15 seconds. Therefore, DAP 102 sets a timer for 15 seconds addition, DAP 102 determines the call routing for the call to reach terminating location T1.

DAP 102 sends the call routing information, and an overflow on demand available indication, to switch 104, as shown in step 408. In a preferred embodiment, the call routing information includes the address of terminating location T1. Switch 104 then routes the call to terminating location T1 using the address, as shown in step 410.

If switch 104 fails to terminate the call to T1, as shown in step 412, then overflow is initiated automatically, as shown in step 420. However, if the call terminates to T1, then switch 104 waits for a response, as shown in step 414. If switch 104 receives a response indicating normal call processing, such as an Answer indication, RWC 16 or the like, then overflow processing is not needed and the process is complete. However, if no such response is received, then overflow processing will be initiated under one of two circumstances.

First, if no response is received before the DAP timer expires, (in this example, within 15 seconds), then overflow processing will occur, as shown in steps 416 and 420. Second, call overflow processing is initiated when the caller presses the "*" key on his telephone keypad, as shown in steps 418 and 420. In this way, the caller can initiate call overflow processing without having to wait for the conditions specified in steps 416 and 418 to occur.

Figure 5:
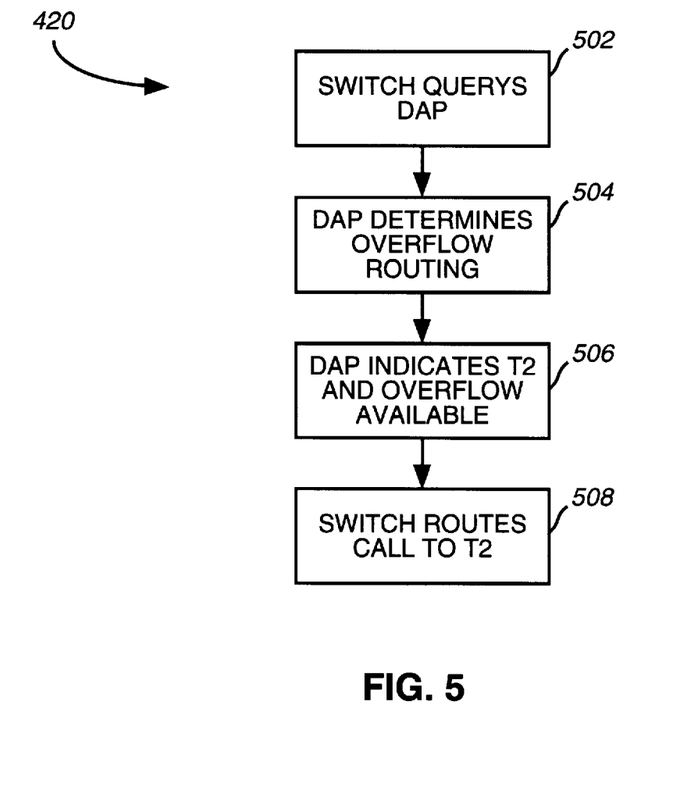
FIG. 5 is a flowchart depicting an example call overflow processing operation.

In this example, assume that the caller initiates overflow on demand processing by presses the "*" key on his telephone keypad. FIG. 5 is a flowchart depicting an example call overflow processing operation, and corresponds to step 420 in FIG. 4. In step 502, switch 104 queries DAP 102 for the call overflow routing information for terminating location T1. In response, DAP 102 determines the call overflow routing by referring to the call processing plan for T1, as shown in step 504. As described above, the T1 call processing plan specifies T2 as a call overflow location. Referring to the call processing plan for T2, the DAP determines a call routing from switch 104 to T2.

As described above, the call processing plan for T2 indicates overflow on demand available and no DAP timer. Therefore, in step 506, DAP 102 sends the call routing information for T2, and an overflow on demand available indication, to switch 104, as shown in step 506. In a preferred embodiment, the call routing information includes the address of terminating location T2. Switch 104 then routes the call to terminating location T2 using the address, as shown in step 508.

Figure 6:
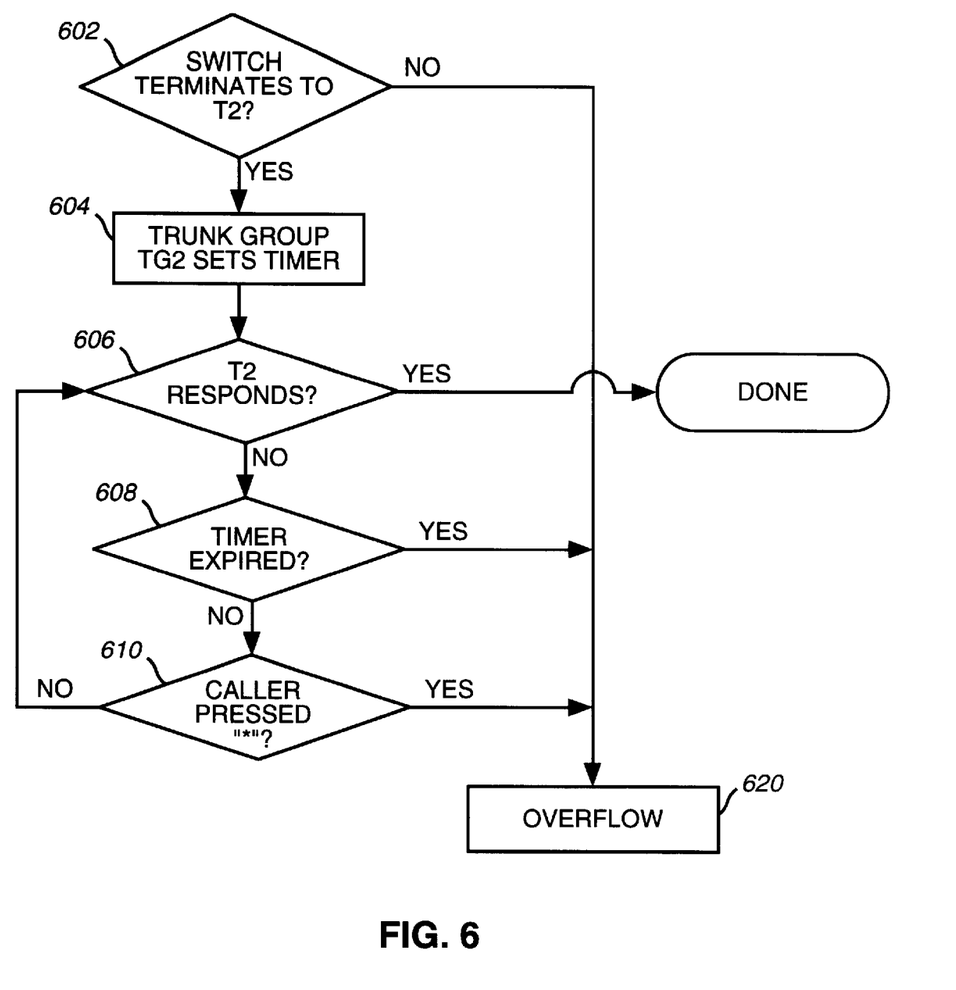
FIG. 6 is a flowchart depicting the operation of the present invention in implementing an example call processing plan.

FIG. 6 is a flowchart depicting the operation of the present invention in implementing the example call processing plan for T2. If the call does not successfully terminate to terminating location T2, then call overflow processing for T2 is invoked automatically, as shown in steps 602 and 620.

As described above, trunk group TG2 specifies a Long Call Disconnect timer of 30 seconds. Therefore, if the call successfully terminates to T2, then trunk group TG2 sets a timer to 30 seconds, as shown in step 604. Switch 104 waits for a response from T2, as shown in step 606. If switch 104 receives a response indicating normal call processing, such as an Answer indication, RWC 16 or the like, then overflow processing is not needed and the process is complete. However, if no such response is received, then overflow processing will be initiated under one of two circumstances.

First, if no response is received before the trunk group TG2 timer expires, (in this example, within 30 seconds), then overflow processing will occur, as shown in steps 608 and 620. Second, call overflow processing is initiated when the caller presses the "*" key on his telephone keypad, as shown in steps 608 and 620. In this way, the caller can initiate call overflow processing without having to wait for the conditions specified in steps 416 and 418 to occur.

In this example, assume that the caller does not initiate overflow on demand processing by pressing the "*" key on his telephone keypad, and that no response is received from T2. Then overflow processing is initiated when the trunk group TG2 timer expires (i.e., after 30 seconds). When the timer expires, trunk group TG2 returns a Long Call Disconnect message to switch 104, which informs DAP 102 that the connection to T2 was unsuccessful. In response, DAP 102 refers to the call processing plan for T2. As described above, the call processing plan for T2 indicates a call overflow location of T2. Therefore, DAP 102 again directs switch 104 to route the call to terminating location T2.

Software/Hardware Implementation

Figure 7:
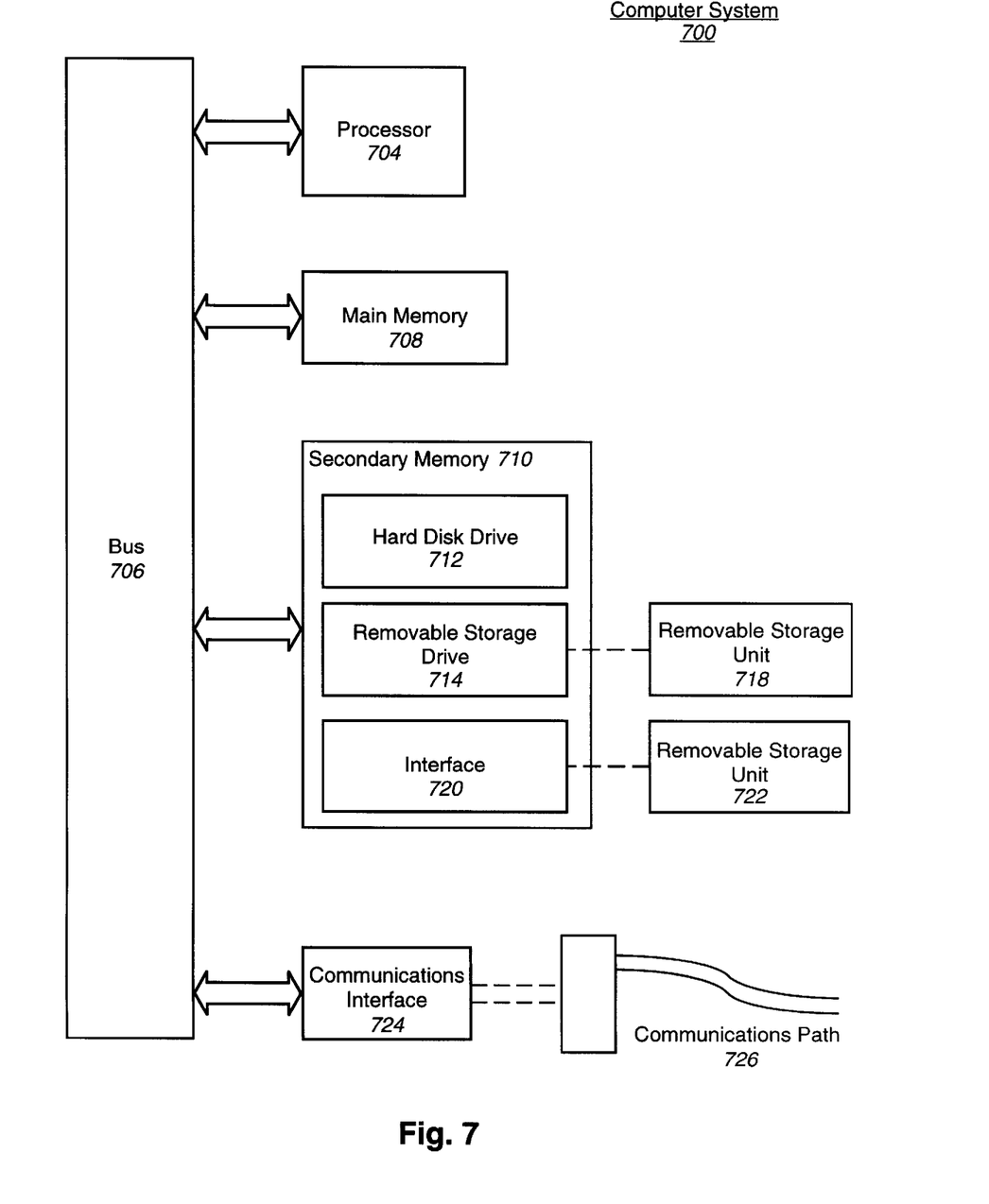
FIG. 7 depicts a computer system capable of carrying out the functionality of the present invention.

Portions of the present invention may be implemented using hardware, software or a combination thereof and may be implemented in a computer system or other processing system. In fact, in one embodiment, the invention is directed toward a computer system capable of carrying out the functionality described herein. An example computer system 700 is shown in FIG. 7. The computer system 700 includes one or more processors, such as processor 704. The processor 704 is connected to a communication bus 706. After reading this description, it will become apparent to a person skilled in the relevant art how to implement the invention using other computer systems and/or computer architectures.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 718 to computer system 700.

Computer system 700 can also include a communications interface 724. Communications interface 724 allows software and data to be transferred between computer system 700 and external devices. Examples of communications interface 724 can include a modem, a network interface (such as an Ethernet card), a communications port, a PCMCIA slot and card, etc. Software and data transferred via communications interface 724 are in the form of signals which can be electronic, electromagnetic, optical or other signals capable of being received by communications interface 724. These signals are provided to communications interface via a channel 726. This channel 726 carries signals and can be implemented using wire or cable, fiber optics, a phone line, a cellular phone link, an RF link and other communications channels.

In this document, the terms "computer program medium" and "computer usable medium" are used to generally refer to media such as removable storage device 718, a hard disk installed in hard disk drive 712, and communications path 726. These computer program products are means for providing software to computer system 700.

Computer programs (also called computer control logic) are stored in main memory and/or secondary memory 710. Computer programs can also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implement using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. A method for performing overflow on demand in a telecommunications network, the method comprising the steps of:

receiving a call from a call originator;

determining an address for a terminating location for said call;

determining that call overflow on demand is available;

routing said call to said terminating location using said address;

performing call overflow when an overflow condition occurs; and performing call overflow when an overflow command is received from said call originator.

2. The method of claim 1, wherein said performing steps each comprises the steps of:

querying said data access point for call overflow routing information for said call;

determining an overflow address for an overflow terminating location for said call; and routing said call to said overflow terminating location using said overflow address.

3. The method of claim 1, further comprising the step of:

performing call overflow when an abnormal condition occurs during call processing.

4. The method of claim 1, further comprising the step of:

performing call overflow in response to a Release With Cause (RWC) value other than RWC 16.

5. The method of claim 1, further comprising the step of:

performing call overflow in response to a Long Call Disconnect indication.

6. A method for performing overflow on demand in a telecommunications network, comprising the steps of:

receiving a call from a call originator;

determining an address for a terminating location for said call;

determining that call overflow on demand is available;

setting a timer;

routing said call to said terminating location using said address;

performing call overflow when said timer expires before a response is received from said terminating location; and performing call overflow when an overflow command is received from said call originator.

7. The method of claim 6, wherein said performing steps each comprises the steps of:

querying said data access point for call overflow routing information for said call;

determining an overflow address for an overflow terminating location for said call; and routing said call to said overflow terminating location using said overflow address.

8. A system for performing overflow on demand in a telecommunications network, the system comprising:

means for receiving a call from a call originator;

means for determining an address for a terminating location for said call;

means for determining that call overflow on demand is available;

means for routing said call to said terminating location using said address;

means for performing call overflow when an overflow condition occurs; and means for performing call overflow when an overflow command is received from said call originator.

9. The system of claim 8, wherein said means for performing each comprises:

means for querying said data access point for call overflow routing information for said call;

means for determining an overflow address for an overflow terminating location for said call; and means for routing said call to said overflow terminating location using said overflow address.

10. The system of claim 8, further comprising:

means for performing call overflow when an abnormal condition occurs during call processing.

11. The system of claim 8, further comprising:

means for performing call overflow in response to a Release With Cause (RWC) value other than RWC 16.

12. The system of claim 8, further comprising:

means for performing call overflow in response to a Long Call Disconnect indication.

13. A system for performing overflow on demand for a call in a telecommunications network, comprising:

means for receiving a call from a call originator;

means for determining an address for a terminating location for said call;

means for determining that call overflow on demand is available;

means for setting a timer;

means for routing said call to said terminating location using said address;

means for performing call overflow when said timer expires before a response is received from said terminating location; and means for performing call overflow when an overflow command is received from said call originator.

14. The system of claim 13, wherein said means for performing each comprises:

means for querying said data access point for call overflow routing information for said call;

means for determining an overflow address for an overflow terminating location for said call; and means for routing said call to said overflow terminating location using said overflow address.

* * * * *